United States Patent
Collina et al.

(10) Patent No.: US 6,908,967 B2
(45) Date of Patent: Jun. 21, 2005

(54) HIGH TRANSPARENCY AND HIGH FLEXIBILITY ELASTOPLASTIC POLYOLEFIN COMPOSITIONS

(75) Inventors: Gianni Collina, Casalecchio di Reno (IT); Anteo Pelliconi, Santa Maria Maddalena (IT); Enea Garagnani, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/305,072

(22) Filed: Nov. 27, 2002

(65) Prior Publication Data

US 2003/0105239 A1 Jun. 5, 2003

Related U.S. Application Data

(63) Continuation of application No. 09/029,025, filed as application No. PCT/EP97/03153 on Jun. 14, 1997, now abandoned.

(30) Foreign Application Priority Data

Jun. 24, 1996 (EP) ............................................. 96201738

(51) Int. Cl.[7] ............................................. C08L 23/04
(52) U.S. Cl. ...................... 525/240; 525/191; 525/322; 525/323
(58) Field of Search ................................ 525/191, 240, 525/322, 323, 246, 192, 211; 526/351, 943

(56) References Cited

U.S. PATENT DOCUMENTS

| 4,547,552 A | 10/1985 | Toyota et al. ............... 525/247 |
| 4,734,459 A | 3/1988 | Cecchin et al. .............. 525/247 |
| 5,286,552 A | 2/1994 | Lesca et al. ................. 428/220 |
| 5,286,564 A | 2/1994 | Cecchin et al. .............. 428/402 |
| 5,483,002 A | 1/1996 | Seelert et al. ............... 428/402 |
| 5,516,848 A | 5/1996 | Canich et al. .............. 525/240 |
| 5,539,056 A | 7/1996 | Yang et al. ................. 525/240 |
| 5,648,422 A * | 7/1997 | Collina et al. ................. 525/52 |
| 6,100,333 A * | 8/2000 | Collina et al. .............. 525/191 |

FOREIGN PATENT DOCUMENTS

| EP | 0 395 083 | 10/1990 |
| EP | 0 400 333 | 12/1990 |
| EP | 0 472 946 | 3/1992 |
| EP | 0 477 662 | 4/1992 |
| WO | WO 92/21706 | 12/1992 |

* cited by examiner

Primary Examiner—Tatyana Zalukaeva

(57) ABSTRACT

Highly transparent and flexible elastoplastic polyolefin compositions which contain A) 10–20 parts by weight of a propylene homopolymer or copolymer with ethylene and/or one or more $CH_2=CHR$ α-olefins, the copolymer containing at least 95% by weight of propylene; B) 5–20 parts by weight of propylene copolymer fraction containing ethylene and insoluble in xylene at room temperature; and C) 60–80 parts by weight of a propylene copolymer fraction containing a comonomer selected from ethylene and mixtures of ethylene with one or more $CH_2=CHR$ α-olefin and soluble in xylene at room temperature, the fraction containing from 15 to 25% by weight of the comonomer, the percent by weight of the sum of the B and C components with respect to the total polyolefin composition being from 80% to 90%.

11 Claims, 1 Drawing Sheet

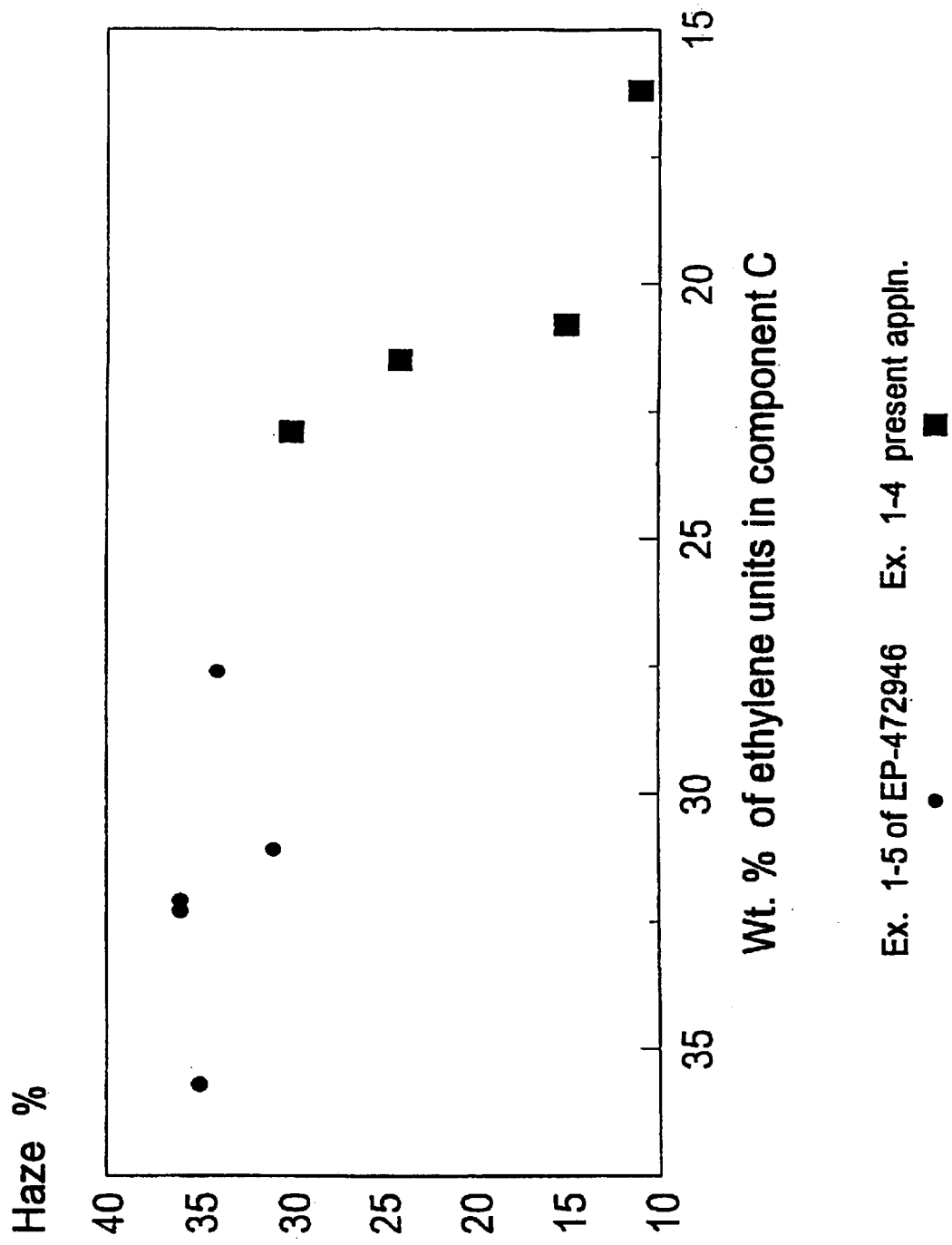

HIGH TRANSPARENCY AND HIGH FLEXIBILITY ELASTOPLASTIC POLYOLEFIN COMPOSITIONS

This application is a continuation of U.S. application Ser. No. 09/029,025, now abandoned, which is a U.S. National Stage of International application PCT/EP97/03153, filed June 14, 1997.

The present invention concerns highly flexible elastoplastic polyolefin compositions endowed with unexpectedly high transparency.

It is known that one can obtain polyolefin compositions having elastic properties while maintaining a good thermoplastic behaviour by way of sequential copolymerization of propylene, optionally containing minor quantities of olefin comonomers, and then ethylene/propylene or ethylene/α-olefin mixtures. Catalysts based on halogenated titanium compounds supported on magnesium chloride are used to this purpose.

Compositions of this type are described in particular in EP 400333. They have a practical interest in many fields since they show the typical properties of polyolefins, such as chemical inertia and lack of toxicity, along with a good level of the mechanical properties. In particular, they have valued elastic properties, as demonstrated by low flexural modulus values, in the range 700 to 200 MPa, associated to good tension set values. These compositions, however, do not generally have good optical properties, in particular transparency.

Attempts to improve the transparency characteristics in compositions prepared by sequential polymerization have generally led to an impairment of the elasticity and flexibility properties. A significant improvement in this direction, however, is reported in EP 472946, which discloses elastoplastic polyolefin compositions endowed with high flexibility comprising: A) 10–50, preferably 20–35 parts by weight of a propylene-based matrix; B) 5–20, preferably 7–15 parts by weight of an elastomeric copolymer fraction containing ethylene, insoluble in xylene at ambient temperature; C) 40–80, preferably 50–70 parts by weight of an elastomeric copolymer fraction containing less than 40% and preferably 25–38% by weight of ethylene, soluble in xylene at ambient temperature. In addition to high flexibility, confirmed by a flexural modulus value lower than 150 MPa, these compositions have a good transparency, as indicated by haze values ranging from 31 to 36% in the examples.

Since polyolefin articles, flexible and transparent, are of large interest in many fields, particularly in the medical, automotive, packaging and electrical cable covering areas, investigations have been carried out in order to improve the quality of the existing materials. As a result it has been found that the balance between flexibility and transparency of the heterophasic polymers of the type discussed above can be further improved by increasing the percentage amount of the elastomeric phase and at the same time decreasing the ethylene content of said elastomeric phase. Quite surprisingly on the basis of the prior art, and in particular of the disclosure of EP 472946, it has been found that transparency does clearly depend on the amount of ethylene units in the elastomeric copolymer fraction soluble in xylene. FIG. 1 shows the haze values for the compositions of the examples 1 to 5 reported in EP 472946 and for the compositions of the examples 1 to 4 reported below, as a function of the ethylene content in the xylene soluble fraction (component C). It can be seen that haze is roughly constant around 35% when ethylene content in said copolymer fraction is more than about 25% by weight, but haze unexpectedly drops to less than half the above said value when the ethylene content in the copolymer fraction soluble in xylene decreases from 25% to about 20%. Below this value haze still decreases slightly, but the increase of the elastic modulus carries the compositions outside of the scope of the instant invention below an ethylene content in the copolymer fraction soluble in xylene of about 15%. Still interesting results for both haze and elastic modulus can be obtained, however, if part of the ethylene in the elastomeric phase is replaced by an α-olefin (see example 5).

The instant invention provides therefore elastoplastic polyolefin compositions endowed with high flexibility and transparency, comprising:
A) 10–20 parts by weight of a homopolymer of propylene or a copolymer of propylene with ethylene and/or one or more $CH_2=CHR$ α-olefins, where R is an alkyl radical having 2 to 6 carbon atoms, said copolymer containing at least 95% by weight of propylene derived units;
B) 5–20 parts by weight of a propylene copolymer fraction containing ethylene derived units, said fraction being insoluble in xylene at room temperature; and
C) 60–80 parts by weight of a propylene copolymer fraction containing units derived from a comonomer selected from ethylene and mixtures of ethylene with one or more $CH_2=CHR$ α-olefin, where R is an alkyl radical having 2 to 6 carbon atoms, said fraction being soluble in xylene at room temperature, said fraction also containing from 15 to 25% by weight, preferably from 15 to 23% by weight of units derived from said comonomer;
the percent by weight of the sum of the B and C components with respect to the total polyolefin composition being from 80% to 90%.

Preferred compositions according to the invention are those comprising 14–18 parts by weight of component A, 5–18 parts by weight of component B and 72–80 parts by weight of component C, when component C contains from 15 to 23% by weight of units derived from the comonomer and the sum of the B and C components is in the range 82 to 86% by weight of the total polyolefin composition.

The total quantity of comonomer in the composition, i.e. ethylene plus optional α-olefin, is preferably from 15 to 22% by weight.

The polyolefin compositions of the invention show haze values below 30%, mostly below 25%, whereas the elastic modulus is always less than 150 MPa, mostly less than 100 MPa.

The compositions can be prepared by sequential polymerization of the monomers in two stages. In the first stage, carried out in one or more reactors, propylene, optionally containing up to 5% by weight of comonomer(s) as said before, is polymerized to form component A and in the second stage, carried out in one or more reactors, the mixture of propylene with ethylene and optionally an α-olefin as said before, is polymerized to form components B and C. Ethylene or a mixture of ethylene and one or more α-olefins, in particular 1-butene, are preferred comonomers in component C. More preferably component C contains units derived from ethylene and said α-olefins each in the amount from 5 to 15% by weight, the total amount of the units derived from said comonomers being preferably from 15 to 23% by weight of the component C.

The first polymerization stage can be carried out either in the liquid phase or in the gas phase. The second polymerization stage is usually carried out in the gas phase. Preferably both stages are carried out in the gas phase. A convenient polymerization process is described in the International Patent Application WO92/21706.

Polymerization temperatures are usually from 40° C. to 90° C. Polymerization pressure depends on the reaction temperature and on the composition of the reacting mixture, indicatively it can be from 5 to 30 atm. The ratio of the residence times in the two stages depends on the desired ratio between fraction A and fraction B+C. Traditional chain transfer agents, such as hydrogen, can be used as molecular weight regulators.

The catalyst used in the polymerization comprises the product of the reaction of a solid component, containing a titanium compound and an internal electron-donor compound supported on magnesium chloride, with an aluminum trialkyl compound and an external electron-donor compound. Catalysts particularly suitable to preparing the copolymers of the invention are those described in EP 395083. Using these catalysts polyolefin compositions in the form of spheroidal particles having an average diameter from about 0.5 to 7 mm can be obtained.

The products which can be obtained from the polyolefin compositions of the present invention can find applications particularly in the medical, automotive and packaging fields.

EXPERIMENTAL METHODS ADOPTED FOR THE MOLECULAR AND PHYSICAL-MECHANICAL CHARACTERIZATION

The amount of the fractions A, B and C and the comonomers content of the fractions B and C were calculated by using the equations quoted in EP 0 472 946 A2.

The molecular and physical-mechanical characteristics were determined according to the following methods:

Ethylene and 1-butene content as wt % by IR spectroscopy.

Intrinsic Viscosity: measure at 135° C. in tetrahydronaphtalene.

Percentage of xylene solubles: 2.5 g of polymer were dissolved in 250 ml of xylene at 135° C. under agitation. After 20 minutes the solution was cooled down to 25° C., with agitation, and then it was allowed to settle for 30 minutes. The precipitate was filtered with filter paper, the solution was evaporated under a nitrogen current, and the residue dried under vacuum at 80° C. to a constant weight. The weight percentage of polymer soluble in xylene at room temperature was calculated.

Melting Point ($T_m$): the polymer $T_m$ was measured with a Perkin-Elmer DSC-7 apparatus according to the following procedure. 10 mg of polymer were heated up to 200° C. at a rate of 10° C./minute; then the sample was kept at 200° C. for 5 minutes and cooled down to 0° C. at a rate of 10° C./minute. Then, the sample was heated up again to 200° C. at a rate of 10° C./minute. The data reported in the tables are from the second heating.

Elastic Modulus: it was measured in the tensile mode at 23° C. on a compression moulded sample, using a device for DMTA (Dynamic-Mechanical Thermal Analysis) of Polymer Laboratories. The measure frequency was 1 Hz and the scanning temperature rate was 2° C./minute.

Hardness: it was measured according to ASTM 2240 on an injection moulded specimen.

Haze: it was measured according to ASTM 1003 on an injection moulded plaque.

Melt Flow Rate: it was measured according to ASTM-D 1238, condition L.

Compression Moulding: samples were moulded with a Carver press under a pressure of 42 kg/cm$^2$, at a temperature of 200° C., for 5 minutes; cooling rate to room temperature was 15° C./minute.

Injection Moulding: the samples were moulded in a Battenfeld BA500CD machine under the following conditions: melt temperature 260° C., injection time 3 sec, mould temperature 40° C., holding time 10 seconds, cooling time 10 seconds, injection pressure 65 bar, holding pressure 25 bar.

EXAMPLES

Example 1

In a 10 ml glass flask 0.1042 g of a solid catalyst component, prepared according to example 3 of EP A 395083, were contacted with 0.4567 g of triethylaluminum and with 0.094 g of cyclohexyl-methyl-dimethoxysilane in 4 ml of dry hexane. The mixture was injected into a 4.25 l steel autoclave, previously subjected to successive rinsing first with hexane at 80° C. for one hour and then with gaseous propylene at 80° C. for one hour. Next, a mixture of 0.95 g of ethylene, 116.4 g of propylene and 405 ml of hydrogen, measured at 1 atm and 25° C., was fed into the reactor. The temperature was raised to 60° C. and polymerization was carried out for 31 minutes; 147 g of propylene and 3.0 g of ethylene were fed during the reaction time. A small sample was withdrawn for the characterization, which gave the following outcome: ethylene content 2.0 wt %, xylene soluble fraction 4.2 wt %, ethylene content in the xylene soluble fraction 11 wt % and intrinsic viscosity 1.97 dl/g. Then, the monomers mixture was vented out and replaced with a mixture of 10 g of ethylene, 98.35 g of propylene and 986 ml of hydrogen, measured at 1 atm and 25° C. The subsequent copolymerization was carried out for 73 minutes at 60° C., feeding 142.1 g of ethylene and 537.9 g of propylene during the reaction time. 800 g of heterophasic copolymer, having the characteristics reported in Table 1, were obtained.

Example 2

In a 10 ml glass flask 0.1096 g of a solid catalyst component prepared as reported in example 1 were contacted with 0.4567 g of triethylaluminum and with 0.094 g of cyclohexyl-methyl-dimethoxysilane in 4 ml of dry hexane. The mixture was injected into a 4.25 l steel autoclave, previously subjected to successive rinsing first with hexane at 80° C. for one hour and then with gaseous propylene at 80° C. for one hour. Next, a mixture of 0.95 g of ethylene, 116.2 g of propylene and 135 ml of hydrogen, measured at 1 atm and 25° C., was fed into the reactor. The temperature was raised to 60° C. and polymerization was carried out for 33 minutes; 147 g of propylene and 3.0 g of ethylene were fed during the reaction time. A small sample was withdrawn for the characterization, which gave the following outcome: ethylene content 2.0 wt %, xylene soluble fraction 4.2 wt %, ethylene content in the soluble fraction 8 wt % and intrinsic viscosity 2.45 dl/g. Then the monomers mixture was vented out and replaced with a mixture of 10.5 g of ethylene, 97.5 g of propylene and 985 ml of hydrogen, measured at 1 atm and 25° C. The subsequent copolymerization was carried out for 67 minutes at 60° C., feeding 142.2 g of ethylene and 513.0 g of propylene during the reaction time. 780 g of heterophasic copolymer, having the characteristics reported in Table 1, were obtained.

Example 3

In a 10 ml glass flask 0.2248 g of a solid catalyst component prepared according to example 1 were contacted with 0.4567 g of triethylaluminum and with 0.094 g of cyclohexyl-methyl-dimethoxysilane in 4 ml of dry hexane. The mixture was injected into a 4.25 l steel autoclave, previously subjected to successive rinsing first with hexane at 80° C. for one hour and then with gaseous propylene at 80° C. for one hour. Next, a mixture of 0.95 g of ethylene, 115.4 g of propylene and 810 ml of hydrogen, measured at 1 atm and 25° C., was fed into the reactor. The temperature was raised to 60° C. and polymerization was effected for 19 minutes, feeding 147 g of propylene and 3.0 g of ethylene during the reaction time. A small sample was withdrawn for the characterization, which gave the following outcome: ethylene content 2.0 wt %, xylene soluble fraction 4.3 wt %, ethylene content in the soluble fraction 12 wt % and intrinsic viscosity 1.6 dl/g. Then the monomers mixture was vented out and replaced with a mixture of 11.5 g of ethylene, 95.65 g of propylene and 981 ml of hydrogen, measured at 1 atm and 25° C. The subsequent copolymerization was carried out for 73 minutes, feeding 161.8 g of ethylene and 518.2 g of propylene during the reaction time. 800 g of a heterophasic copolymer, having the characteristics reported in Table 1, were obtained.

Example 4

Pilot Plant Run

In a 0.25 l vessel type reactor 1.0 kg/h of propane, 23.1 g/h of triethylaluminum, 5.5 g/h of dicyclopentyldimethoxysilane and 4.4 g/h of solid catalyst component prepared according to the example 1 were continuously fed; the temperature was 20° C. and the residence time was 5 minutes. Then, the precontacted catalytic system was continuously fed in a pre-polymerization reactor. In the same reactor were fed 7 kg/h of propylene and 12 kg/h of propane; the temperature was 20° C., the pressure 30 bar and the residence time 30 minutes. The prepolymer was continuously fed to a 100 l gas phase, fluidized bed reactor where the temperature was kept at 65° C., the pressure was 18 bar and the gas phase composition was the following: propylene 8.2 mol %, propane 89.3 mol % and hydrogen 0.74 mol %. The mileage was around 800 g/g catalyst. A small sample was withdrawn for the characterization: it showed a MFR value of 8 dg/min and 2.0 wt % of xylene soluble fraction. Then, the homopolymer was continuously fed to another 300, l gas phase, fluidized bed reactor where the temperature was kept at 65° C., the pressure was 16 bar and the gas phase composition was the following: propylene 65.4 mol %, propane 25.4 mol %, ethylene 7.2 mol % and hydrogen 0.65 mol %. The mileage, was around 4000 g/g catalyst. The molecular and physical-mechanical characteristics of the heterophasic copolymer are shown in Table 1.

Example 5

Terpolymer

In a 10 ml glass flask 0.1094 g of a solid catalyst component prepared according to example 1 were contacted with 0.4567 g of triethylaluminum and with 0.094 g of cyclohexyl-methyl-dimethoxysilane in 4 ml of dry hexane. The mixture was injected into a 4.25 l steel autoclave, previously subjected to successive rinsing first with hexane at 80° C. for one hour and then with gaseous propylene at 80° C. for one hour. Next, a mixture of 0.95 g of ethylene, 116.3 g of propylene and 405 ml of hydrogen, measured at 1 atm and 25° C., was fed into the same reactor. The temperature was raised to 60° C. and polymerization was effected for 27 minutes; 147 g of propylene and 3 g of ethylene were fed during the reaction time. A small sample was withdrawn for the characterization, which gave the following outcome: ethylene content 2.0 wt %, xylene soluble fraction 4.2 wt %, ethylene content in the xylene soluble fraction 15 wt % and intrinsic viscosity 1.9 dl/g.

Then, the monomers mixture was vented out and replaced with a mixture of 3.9 g of ethylene, 91.7 g of propylene, 32.6 g of 1-butene and 1061 ml of hydrogen, measured at 1 atm and 25° C. The subsequent copolymerization was carried out for 91 minutes at 60° C., feeding 53.5 g of ethylene and 434.3 g of propylene and 107.1 g of 1-butene during the reaction time. 745 g of a heterophasic terpolymer, having the characteristics reported in Table 2, were obtained.

TABLE 1

Molecular structure and properties of ethylene/propylene heterophasic copolymers.

| | | Example | | | |
|---|---|---|---|---|---|
| | Unit | 1 | 2 | 3 | 4 |
| Ethylene units in the copolymer | wt % | 18.1 | 18.5 | 20.5 | 14 |
| Intrinsic viscosity | dl/g | 2.34 | 2.28 | 2.34 | 2.3 |
| Copolymer portion soluble in xylene | wt % | 72.8 | 73.7 | 70.6 | 68.8 |
| Ethylene units in copolymer portion soluble in xylene | wt % | 20.7 | 21.4 | 22.8 | 16 |
| Fraction A | wt % | 15 | 16 | 15 | 15 |
| Fraction B | wt % | 12.8 | 11 | 15 | 16.5 |
| Fraction C | wt % | 72.2 | 73 | 70 | 68.5 |
| Ethylene units in fraction C | wt % | 20.8 | 21.5 | 22.9 | 16.1 |
| Ethylene units in fraction B | wt % | 21.5 | 23.3 | 28.2 | 18.2 |
| Melting temperature | ° C. | 153 | 152 | 153 | 162 |
| Elastic Modulus | MPa | 84 | 82 | 86 | 130 |
| Hardness | Shore D | 28 | 26 | 29 | 34 |
| Haze | % | 15 | 24 | 30 | 11 |

TABLE 2

Molecular structure and properties of ethylene/propylene/1-butene heterophasic terpolymers.

| | Unit | Example 5 |
|---|---|---|
| Ethylene units | wt % | 7.4 |
| 1-butene units | wt % | 10.5 |
| Intrinsic viscosity | dl/g | 2.12 |
| Portion soluble in xylene | wt % | 78 |
| Ethylene units in the portion soluble in xylene | wt % | 9 |
| Fraction A | wt % | 17 |
| Fraction B | wt % | 5.7 |
| Fraction C | wt % | 77.3 |
| Ethylene units in fraction C | wt % | 8.9 |
| Ethylene units in fraction B | wt % | 3.1 |
| 1-butene units in fraction C | wt % | 12.4 |
| 1-butene units in fraction B | wt % | 16.6 |
| Melting temperature | ° C. | 153 |
| Elastic Modulus | MPa | 110 |
| Hardness | Shore D | 35 |
| Haze | % | 9 |

What is claimed is:
1. A polyolefin composition comprising:
A) 14–18 parts by weight of a homopolymer of propylene or a copolymer of propylene with ethylene and/or one or more $CH_2=CHR$ α-olefins, where R is an alkyl radical having 2 to 6 carbon atoms, said copolymer containing at least 95% by weight of propylene derived units;

B) 5–18 parts by weight of a propylene copolymer fraction containing ethylene derived units, said fraction being insoluble in xylene at room temperature; and C) 72–80 parts by weight of a propylene copolymer fraction containing units derived from a comonomer selected from ethylene and mixtures of ethylene with one or more $CH_2=CHR$ α-olefin, where R is an alkyl radical having 2 to 6 carbon atoms, said fraction being soluble in xylene at room temperature, said fraction also containing from 15 to 23% by weight of units derived from said comonomer;

the percent by weight of the sum of the B and C fractions with respect to the total polyolefin composition being from 82% to 86%, wherein the haze of said composition is less than 25%, wherein the quantity of ethylene plus optional α-olefin in the total composition is from 15 to 22% by weight, and wherein a difference in the weight percent ethylene content of fraction B) and the weight percent ethylene content of fraction C) is not more than 1.8 weight percent.

2. A polyolefin composition according to claim 1 wherein fraction A) is a homopolymer of propylene.

3. A polyolefin composition according to claim 1 wherein fraction A) is a copolymer of propylene with ethylene.

4. A polyolefin composition according to claim 1 wherein fraction C) is a copolymer of propylene with ethylene and one or more $CH_2=CHR$ α-olefins, where R is an alkyl radical having 2 to 6 carbon atoms.

5. A polyolefin composition according to claim 4 wherein said copolymer of propylene with ethylene and one or more $CH_2=CHR$ α-olefins contains from 5 to 15% by weight of ethylene derived units and from 5 to 15% by weight of α-olefin derived units, the total content of units derived from ethylene or from α-olefins in said copolymer being from 15 to 22% by weight of said copolymer.

6. A polyolefin composition according to claim 4 wherein said copolymer is a copolymer of propylene with ethylene and 1-butene.

7. A polyolefin composition according to claim 1 wherein fraction A) is a homopolymer of propylene and fraction C) is a copolymer of propylene with ethylene and one or more $CH_2=CHR$ α-olefins, where R is an alkyl radical having 2 to 6 carbon atoms.

8. A polyolefin composition according to claim 1 wherein fraction A) is a copolymer of propylene with ethylene and fraction C) is a copolymer of propylene with ethylene and one or more $CH_2=CHR$ α-olefins, where R is an alkyl radical having 2 to 6 carbon atoms.

9. A polyolefin composition according to claim 1 wherein the elastic modulus is less than 150 MPa.

10. A polyolefin composition according to claim 9 wherein the elastic modulus is less than 100 MPa.

11. An article comprising a polyolefin composition according to claim 1.

* * * * *